United States Patent [19]

Teramachi

[11] 4,363,526
[45] * Dec. 14, 1982

[54] LINEAR MOTION BALL BEARING UNIT

[76] Inventor: Hiroshi Teramachi, 2-34-8, Higashi-Tamagawa, Setagaya-ku, Tokyo, Japan, 158

[*] Notice: The portion of the term of this patent subsequent to Jan. 5, 1999, has been disclaimed.

[21] Appl. No.: 228,128

[22] Filed: Jan. 26, 1981

[30] Foreign Application Priority Data

Feb. 6, 1980 [JP] Japan ............................ 55-012841[U]

[51] Int. Cl.$^3$ ............................................. F16C 29/06
[52] U.S. Cl. .................................. 308/6 C; 464/168
[58] Field of Search ................ 308/6 C, 3 A; 64/23.7; 464/168

[56] References Cited

U.S. PATENT DOCUMENTS

| 3,897,982 | 8/1975 | Teramachi | 308/6 C X |
|---|---|---|---|
| 3,951,472 | 4/1976 | Schurger et al. | 308/6 C |
| 4,040,679 | 8/1977 | Teramachi | 308/6 C |
| 4,118,101 | 10/1978 | Teramachi | 308/6 C |
| 4,206,951 | 6/1980 | Ernst et al. | 308/6 C |
| 4,309,061 | 1/1982 | Teramachi | 308/6 C |

FOREIGN PATENT DOCUMENTS 2838481  5/1979  Fed. Rep. of Germany ...... 308/6 C

Primary Examiner—Stuart S. Levy
Assistant Examiner—Daniel P. Stodola
Attorney, Agent, or Firm—George B. Oujevolk

[57] ABSTRACT

A linear motion ball bearing arrangement having an outer sleeve which has load carrying ball grooves in its inner periphery and fitted in a tunnel-like axial cavity of a casing. The non-load carrying ball grooves are formed by a simple milling and shaping operation so as to provide a linear motion ball bearing unit at a reduced cost.

1 Claim, 7 Drawing Figures

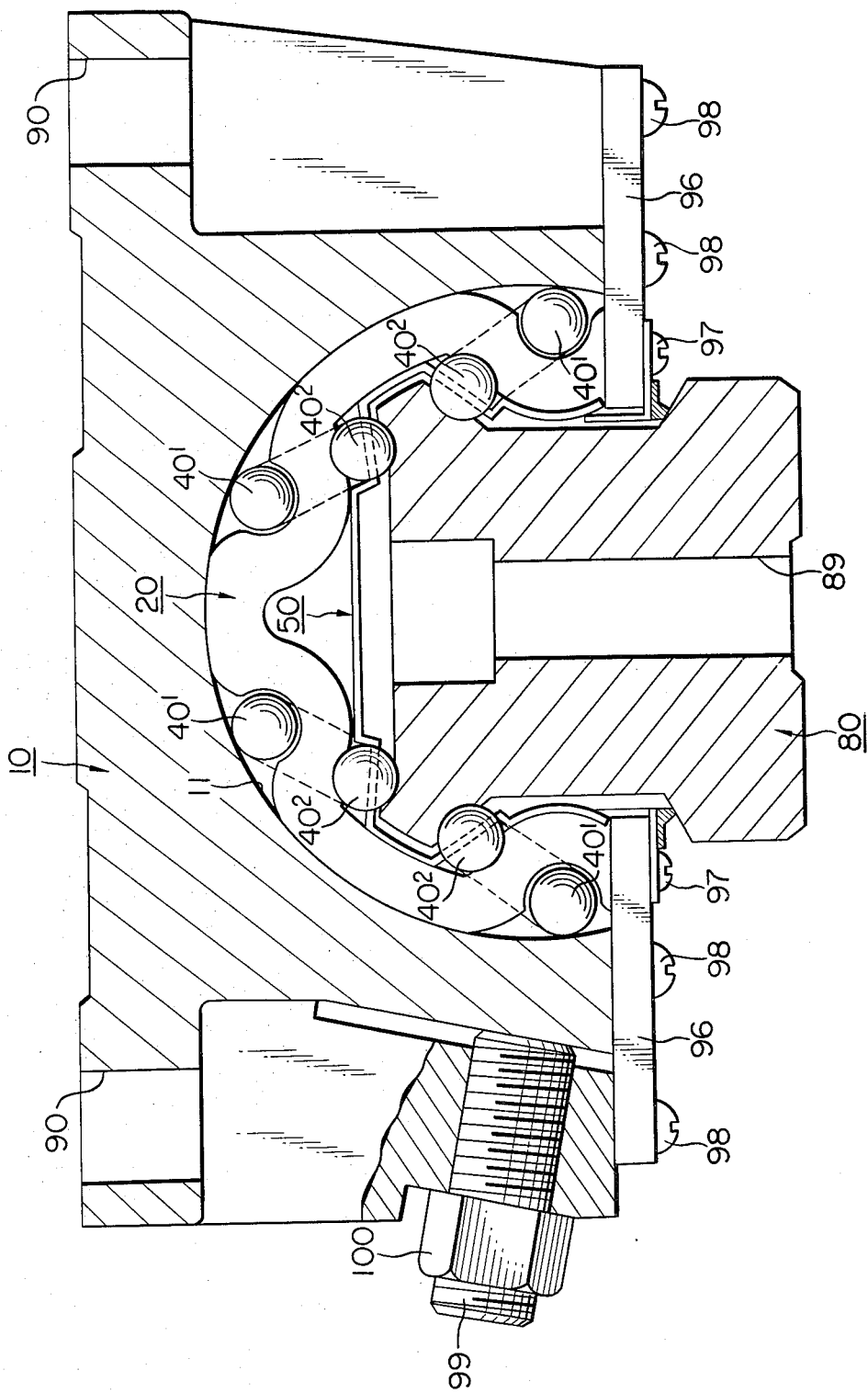

LINEAR MOTION BALL BEARING UNIT

BACKGROUND OF THE INVENTION

This invention relates to improvements in linear motion ball bearing units.

The linear motion ball bearing unit, which has the balls held inbetween R-grooves of a precision-machined track shaft and load carrying ball grooves of a race cylinder of the bearing for circulation in an endless manner to and from load carrying and non-load carrying ball grooves of the race body through ball guide U-grooves of end lids, ensures light and smooth motions even in preloaded state without involving frictional wear of sliding parts, so that it is suitable for applications to those machines which require high positioning accuracy as well as repeating accuracy and rigidity, for example, to machining centers, X-Y-Z guides of various NC machine tools, electric discharge machines, high speed presses, precision press ram guides, press die exchangers and diversified kinds of weight transfer devices.

Generally, with a bearing unit which is provided with a plural number of drilled grooves in its casing for circulation of non-load carrying balls in the axial direction (U.S. Pat. No. 4,127,309), an increase in cost is unavoidable due to the difficulty of speeding up the drilling operation with use of existing drilling tools.

On the other hand, in a case where the non-load carrying ball grooves are formed in a casing itself, it becomes necessary to use a casing of a large wall thickness. (U.S. Pat. No. 4,040,679). This results in a bearing unit construction which is large-sized in height from the lower side of the track shaft to the top of the casing. In this instance the bearing is greatly influenced by lateral and upward loads and its application is limited to some extent.

In an attempt to eliminate these problems, the present inventors disclosed in their prior application (now U.S. Pat. No. 3,897,982) a slide way bearing which incorporates an outer sleeve in a tunnel-like recess of a casing. This bearing construction, however, requires a complicate fabrication process for forming the ball grooves in both the outer sleeve and the retainer for the guidance of the non-load carrying balls.

SUMMARY OF THE INVENTION

It is an object of the present invention to provide a linear motion ball bearing unit employing an outer sleeve which has load carrying ball grooves on its inner periphery and fitted in a tunnel-like axial cavity of a casing. Therefore, the non-load carrying ball grooves can be formed efficiently by simple milling and shaping operations, allowing to provide a linear motion ball bearing unit at a reduced cost.

According to the present invention, there is provided a linear motion ball bearing, comprising: a casing substantially of rectangular shape having a tunnel-like axial cavity open on the bottom side thereof; a cylindrical race body or sleeve having the outer periphery thereof formed in conformity with the inner periphery of the tunnel-like cavity of the casing and provided on the inner periphery thereof with U-shaped axial channels at symmetrical positions on opposite sides of and at an angle of about 60° with a vertical line through the longitudinal axis thereof, the U-shaped channels each having a pair of concave longitudinal load carrying ball raceways substantially of the same curvature as the ball bearings, and on the outer periphery thereof with U-shaped non-load carrying ball grooves of a depth slightly larger than the diameter of the balls, the sleeve further having on the inner periphery thereof a number of longitudinal grooves for location of a retainer; the retainer having arcuate wall portions, longitudinal ribs in alignment with the locating grooves of sleeve and trapezoidally folded side wall portions engaged with the U-shaped channels of the sleeve and each having an arcuate top wall and side walls with slits of a width slightly smaller than the diameter of the balls, each slit having guide torques formed integrally at opposite ends thereof; end lids fixedly attached to the opposite end faces of the sleeve and each provided with a U-shaped turn groove continuously to a load carrying ball raceway and a non-load carrying ball groove of the sleeve; the bearing structure constituted by the sleeve and the retainer having the respective load carrying ball raceways and non-load carrying ball grooves filled with a plural number of ball bearings and saddled on the track shaft with longitudinal guide grooves substantially of the same curvature as the ball bearings.

The above and other objects, features and advantages of the present invention will become apparent from the following description taken in conjunction with the accompanying drawings which show by way of example preferred embodiments of the invention.

BRIEF DESCRIPTION OF THE DRAWINGS

In the accompanying drawings:

FIGS. 6 and 7 are end views of other embodiments of the present invention.

DESCRIPTION OF PREFERRED EMBODIMENTS

Figure 1:
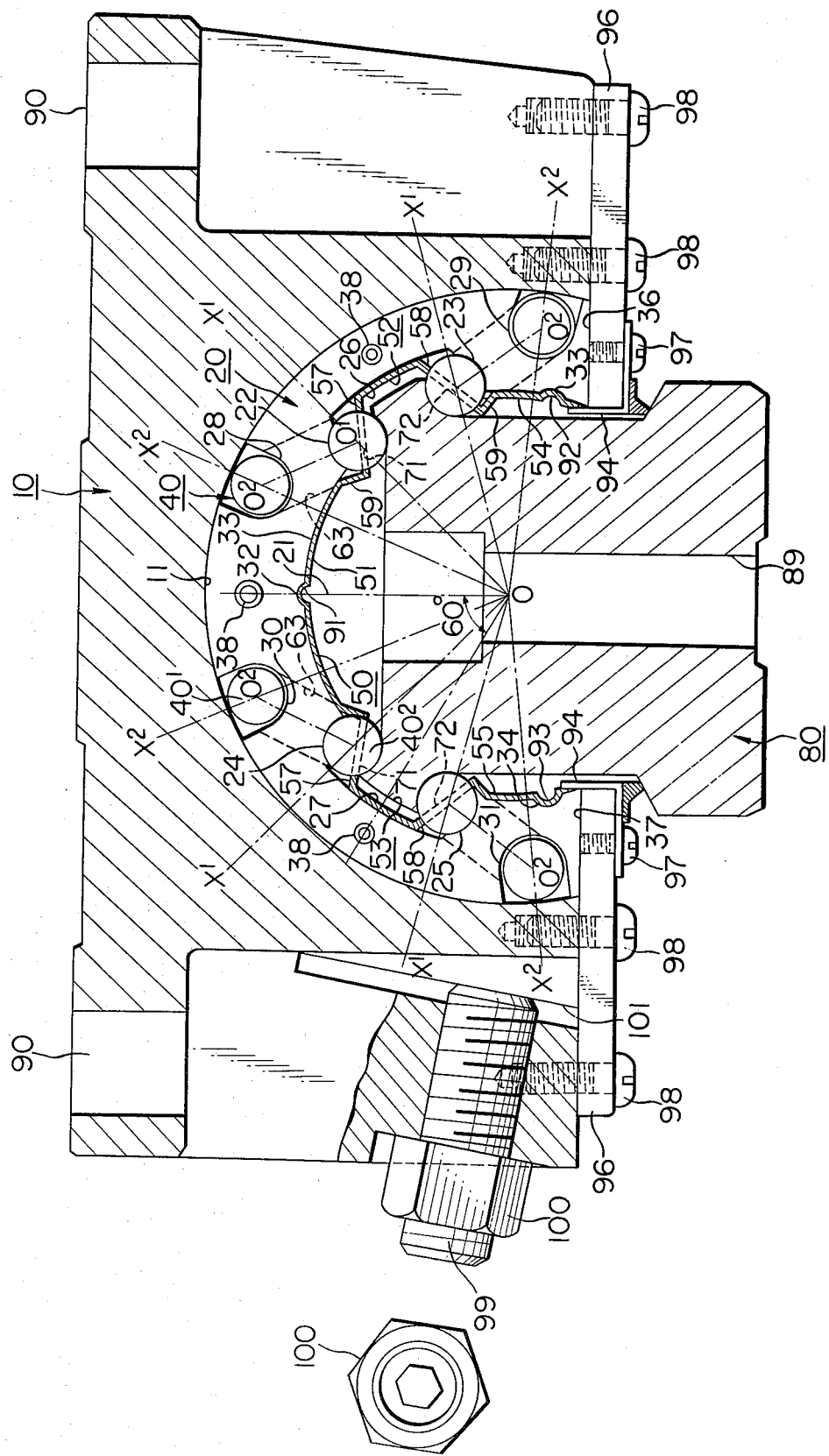
FIG. 1 is a schematic vertical section of a linear motion ball bearing unit according to the present invention.
Figure 2:
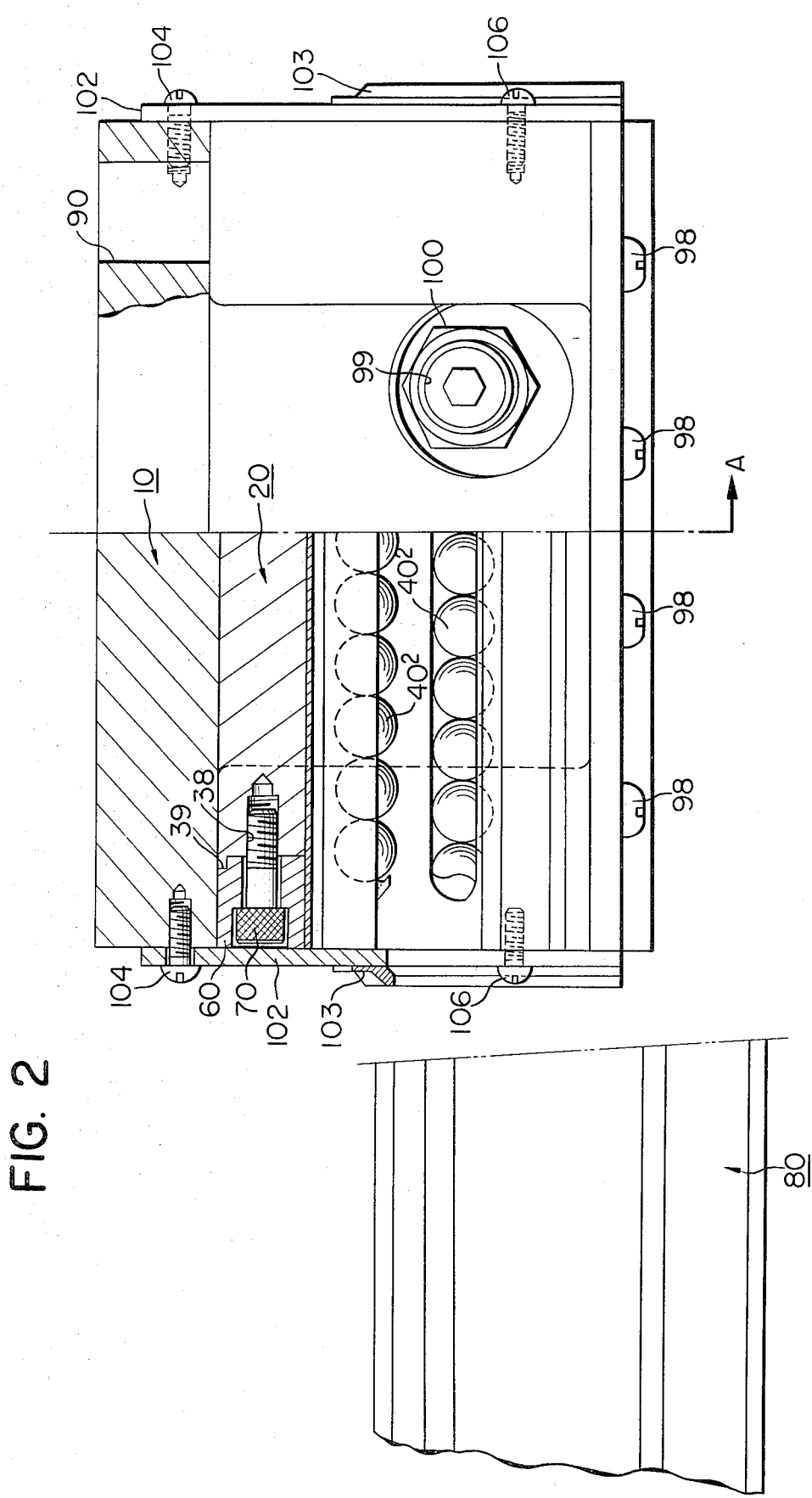
FIG. 2 is a side view partly in section of the linear motion ball bearing unit of the invention.
Figure 3:
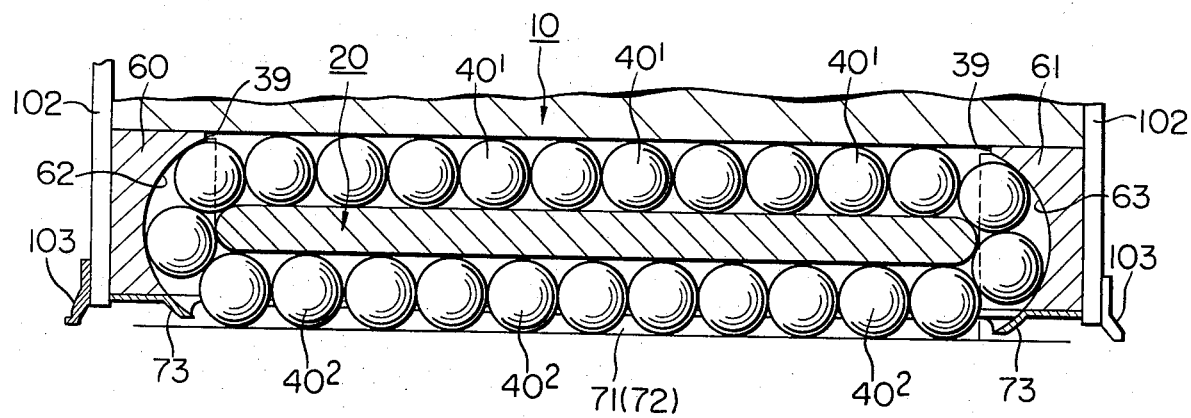
FIG. 3 is a sectional view taken on line $X-O_1-O_2-X^1$ of FIG. 1.
Figure 4:
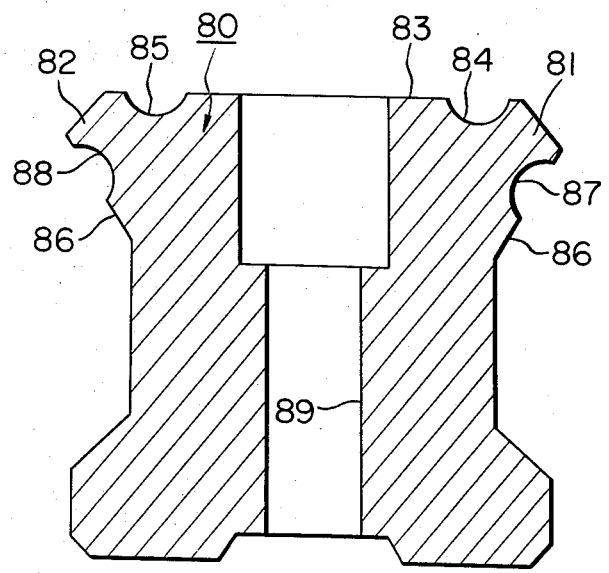
FIG. 4 is a sectional view of the track shaft.
Figure 5:
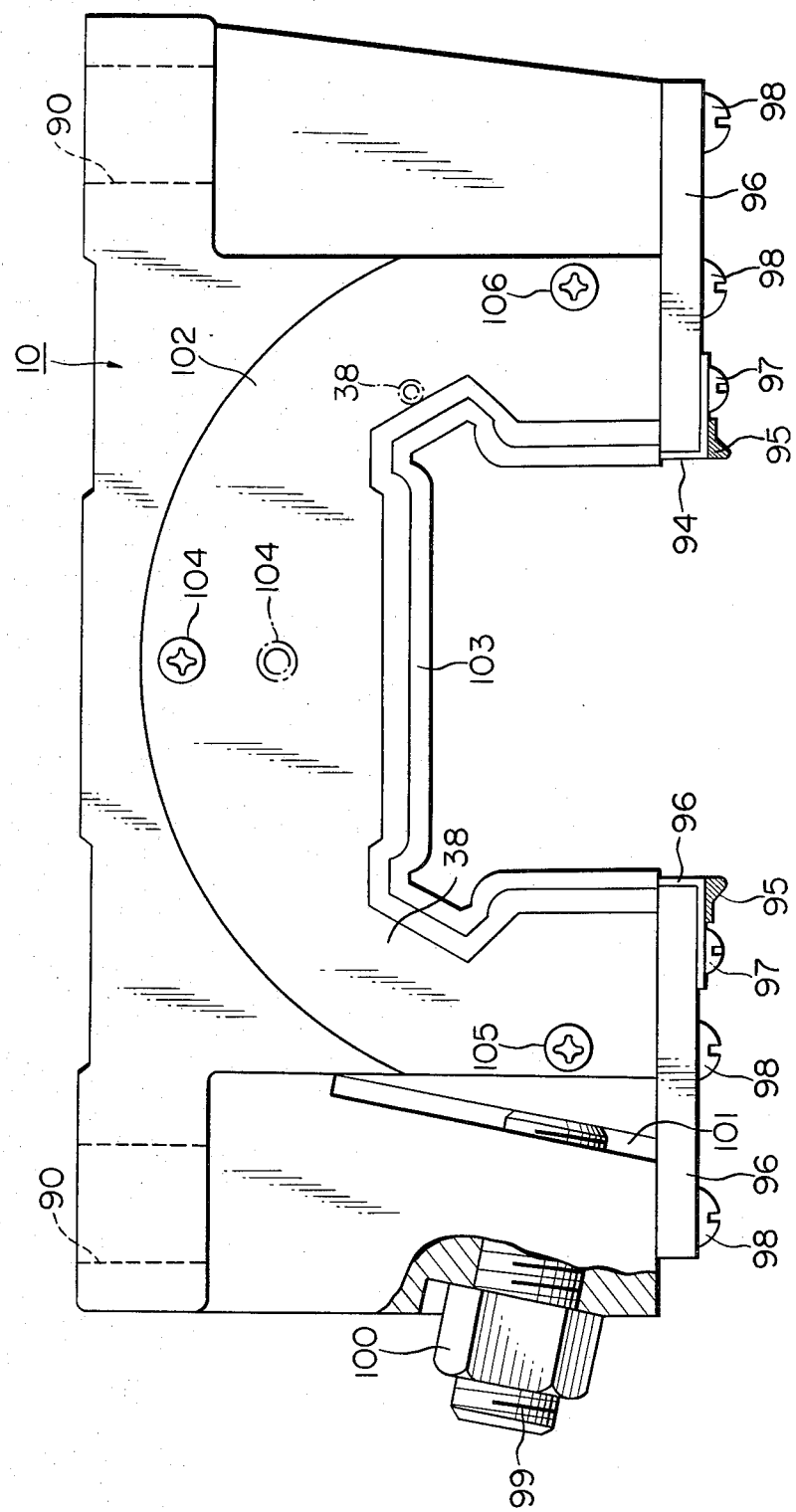
FIG. 5 is a schematic front elevation of the linear motion ball bearing unit of the invention.

Referring to the drawings, indicated at 10 is a casing substantially of rectangular shape with a tunnel-like axial cavity 11 which is open on its bottom side. An outer sleeve 20 of a steel material has its outer periphery so shaped as to conform with the inner periphery of the cavity 11 and is provided on its inner periphery with axial channels 26 and 27 of inverted U-shape in symmetrical positions spaced by 60° from a vertical line 21 through the center O of the outer sleeve 20. Formed on the opposite side walls of the U-channels 26 and 27 are load carrying ball grooves or concave raceways 22 to 25 which are substantially of the same radius of curvature as the balls 40 and defined by a circle having a center at $O^1$.

Line $O-X^1$ which connects the center O of the outer sleeve 20 with the center $O^1$ of the load carrying ball guide grooves forms an angle of about 20° with line $O-X^2$ on the side of the open end 36 or 37. The center $O^2$ on the line $O-X^2$ is located on a line which is diposed at an angle of about 20° with a vertical line through the center $O^1$ of the load carrying ball guide groove.

Thus, the non-load carrying ball grooves 28 to 31 of substantially U-shape in section are formed at symmetrical positions on the outer periphery of the outer sleeve 20 with the respective centers at $O^2$ and in a depth slightly greater than the diameter of the balls 40. Indicated at 32 is a longitudinal or axial groove which is formed centrally on the inner peripheral surface 35 of the outer sleeve 20 between the load carrying ball grooves 22 and 24 for the location of the retainer 50 and at the same time for enhancing its rigidity.

The reference numerals 33 and 34 denote side grooves which are formed on the inner peripheral surface 35 of the outer sleeve 20 for the location and prevention of dislocation of the retainer 50, and are located at positions below the load carrying ball grooves 23 and 25 close to the open ends 36 and 37, respectively.

The outer sleeve 20 is provided with tapped holes 38 on its opposite end faces for engagement with screws 70 which attach end lids 60 and 61 to the respective end faces. The end lids 60 and 61 are fixed in position by guides in the form of annular projections 39 which are formed at the opposite ends of the outer sleeve 20.

The retainer 50 is formed by bending a wide elongated steel strip on a press, firstly forming longitudinal trapezoidal ridges symmetrically on outer sides of arcuate center walls 51 and contiguously to outer flat walls 54 and 55, respectively.

The wedges 52 has its top wall formed in a curvature which conforms with the bottom surface of the U-channel 26 of the outer sleeve 20 and is provided on the opposite sides of the top wall 56 with outwardly converging side walls 57 and 58 which are connected respectively to the arcuate and flat wall portions 51 and 54 through narrow connecting portions 59.

The oblique side walls 57 and 58 of the retainer 50 are provided with slits 71 and 72, respectively, each slit having a width slightly smaller than the diameter of the balls 40. Indicated at 73 are guide tongues which are formed at the opposite ends of the slits 71 and 72 when punching the slits 71 and 72. These guide tongues 73 serve to scoop up the circulated balls from a load carrying or non-load carrying ball guide groove.

The side lids 60 and 61 are provided with U-shaped turn grooves 62 and 63, respectively, each in communication with a load carrying ball groove and a non-load carrying ball groove for turning the circulated balls from the former to the latter or vice versa.

Designated at 80 is a track shaft substantially of X-shape in section, which has a length suitable for the intended linear motion of the bearing assembly of the outer sleeve and the casing. The track shaft 80 is provided with a pair of longitudinal shoulder protuberances 81 and 82 which define on the respective upper wall surfaces 83 a pair of round-bottomed ball guide grooves 84 and 85 at positions opposing the load carrying ball grooves 22 and 24 of the afore-mentioned outer sleeve 20, the bottoms of the R-grooves 84 and 85 having substantially the same curvature as the balls 40.

The track shaft 80 is fixed on a sliding portion of a machine by the use of mounting holes 89 which are provided at suitable intervals along the length thereof.

The reference numeral 90 denotes mounting holes which are provided at the four coners of the casing 10, while the reference numerals 91 to 93 indicate ribs for the location of the retainer 50. The retainer 50 is held in position by L-shaped retainer holders 94 which have a dust seal 95 heat-bonded on the underside thereof and which are fixed to bottom plates 96 by screws 97.

After preloading the casing 10 by adjustor bolts 99 and lock nuts 100, the outer sleeve and retainer 50 are fixed to the casing 10 by bottom plates 96 and clamp screws 98.

Indicated at 101 is a slit which is provided in the side wall of the bearing casing, at 102 are end plates with a wiper 103 attached around the marginal edges thereof, and at 104 to 106 are end plate mounting screws.

The linear motion ball bearing unit of the invention which consists of the component parts of the above-described constructions is assembled in the following manner.

In the first place, the outer sleeve 20 with the retainer 50 is fitted into the tunnel-like cavity 11 of the casing 10, attaching one end lid 61 to one end face of the outer sleeve 20.

In the next place, the balls 40 are successively put into the unloaded ball grooves 28 to 31 at the other open end of the outer sleeve 20 until the casing 10 and non-load carrying ball grooves 22 to 25 are suitably filled with the balls 40 through the U-shaped turn groove 63 of the end lid 61.

Nextly, the other end lid 60 is attached to the other end of the outer sleeve 20 and the end plates 102 are fixed to the casing 10 by screws.

The bearing assembly is then fitted on the track shaft and, after adjusting the clearances between the load carrying balls $40^2$ and the ball guide grooves 84, 85, 87 and 88, the outer sleeve 20 and retainer 50 are fixed to the casing 10 by means of the bottom plates 96.

In use, for example, the track shaft 10 is mounted on a fixed part of a machine tool and the bearing assembly is moved therealong together with a table. As the table is moved, the respective rows of load carrying balls $40^2$ between the round-bottomed guide grooves 84, 85, 87 and 88 of the track shaft and the load carrying ball grooves 22 to 25 are caused to roll therealong under the guidance of the slits 71 and 72 of the retainer 50 and successively turned by the guide tongues 73 at the ends of the respective slits 71 and 72 toward the non-load carrying ball grooves 28 to 31, rolling along the semicircular or U-shaped turn grooves 62 and 63 to become non-load carrying balls $40^1$.

As described hereinbefore, the linear motion ball bearing unit of the present invention employs an outer sleeve which has the load carrying ball grooves formed on the inner periphery thereof, passing the balls from the load carrying ball grooves through the U-shaped turn grooves to the non-load carrying ball grooves which are located in radially offset positions. Therefore, it becomes possible to reduce the outer diameter of the cylindrical race sleeve. In addition, the R-grooves for the load carrying balls and the U-grooves for the non-load carrying balls can be formed by simple grooving operations (of high precision) using a milling cutter and a shaper, permitting to enhance the production efficiency.

Figure 6:
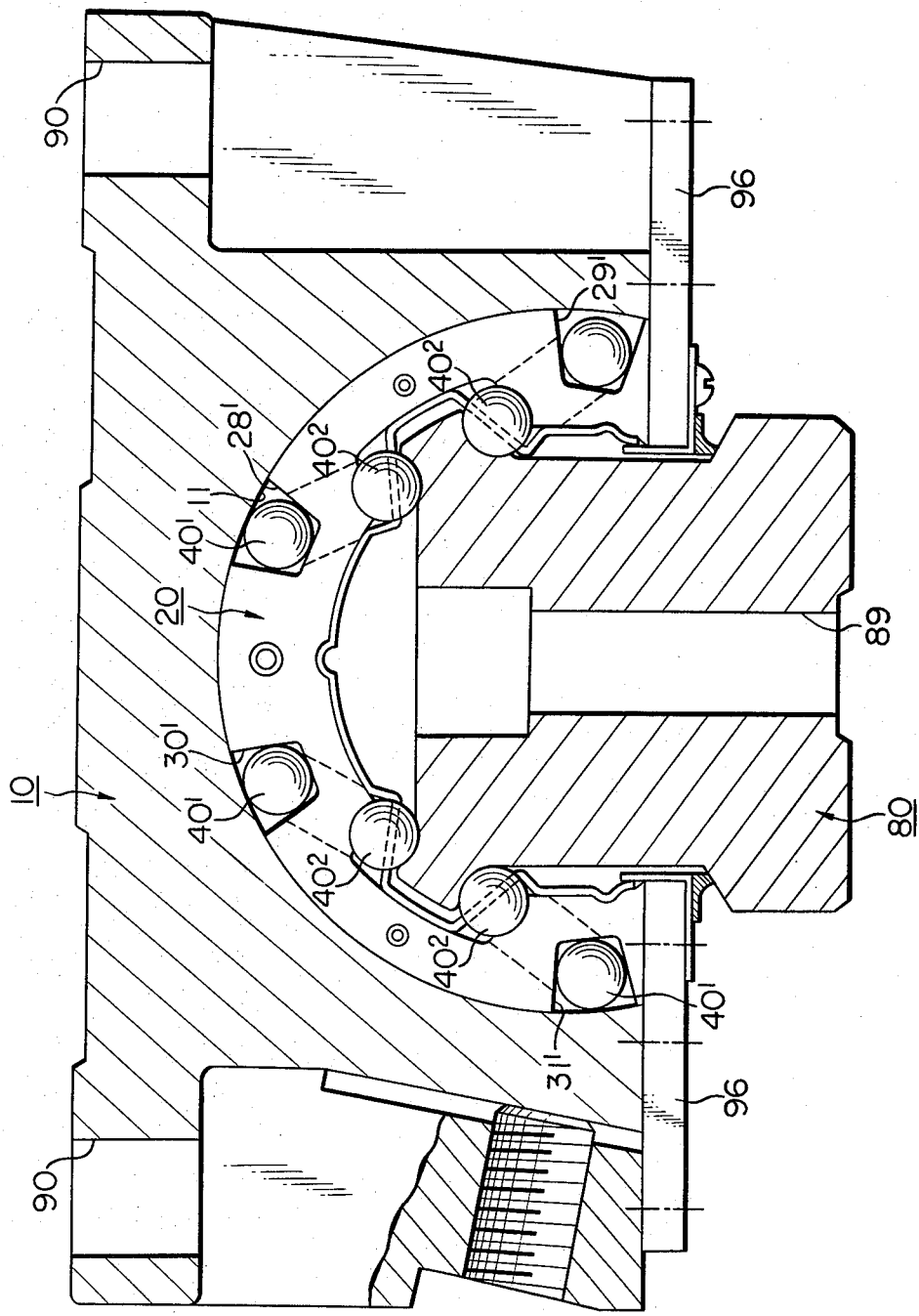

FIGS. 6 and 7 illustrate further embodiments of the present invention. In the embodiment of FIG. 6, the race sleeve $20^1$ has non-load carrying ball grooves $28^1$ to $31^1$ substantially of inverted trapezoidal shape which can be formed by drawing a steel strip.

The embodiment of FIG. 7 employs a cylindrical race sleeve $20^2$ which is obtained by press-forming a thick steel pipe into a sinusoidal form with non-load carrying ball grooves $28^2$ to $31^2$.

Obviously, the race sleeves $20^1$ and $20^2$ which do not require any cutting operation for fluting the non-load carrying ball grooves all the more contribute to the cost reduction.

Although some preferred embodiments of the invention have been described and shown, it is to be understood that the invention is not limited to the particular details shown and includes all the alterations and modifications as encompassed by the appended claim.

What is claimed is:

1. A linear motion ball bearing unit including a bearing assembly reciprocatingly movable along a track shaft through rolling ball bearings and having a casing, a cylindrical race sleeve fitted in said casing, end lids and a retainer, characterized in that:

said casing being formed substantially in a rectangular shape and having a tunnel-like axial cavity open on the bottom side thereof;

said race sleeve having the outer periphery thereof formed in conformity with the inner periphery of said tunnel-like cavity of said casing and provided on the inner periphery thereof with U-shaped axial channels at symmetrical positions on opposite sides of and at an angle of about 60° with a vertical line through the longitudinal axis thereof, said U-shaped channels each having a pair of concave longitudinal load carrying ball raceways substantially of the same curvature as said ball bearings, and on the outer periphery thereof with U-shaped non-load carrying ball grooves of a depth slightly larger than the diameter of said ball, said sleeve further having on the inner periphery thereof a number of longitudinal grooves for location of said retainer;

said retainer having generally arcuate wall portions, longitudinal ribs in alignment with said locating grooves of said sleeve and trapezoidally folded side wall portions each with an arcuate top wall and a pair of slits formed in the opposing side walls in a width slightly smaller than the diameter of said balls, each slit having guide tongues integrally formed at the opposite ends thereof;

said end lids being fixedly attached to opposite end faces of said race sleeve and each being provided with a U-shaped turn groove continuously to a load carrying ball raceway and a non-load carrying ball groove of said sleeve;

the bearing assembly constituted by said sleeve and said retainer having the respective load-carrying and non-load carrying ball grooves filled with a plural number of ball bearings and mounted on said track shaft with longitudinal raceway grooves substantially of the same curvature as said ball bearings.

* * * * *